United States Patent [19]

Stewart

[11] 4,313,234

[45] * Feb. 2, 1982

[54] TOILET

[75] Inventor: John M. Stewart, River Drive Park, Canada

[73] Assignee: Santerra Industries Ltd., Downsview, Canada

[*] Notice: The portion of the term of this patent subsequent to Apr. 8, 1997, has been disclaimed.

[21] Appl. No.: 124,365

[22] Filed: Feb. 25, 1980

Related U.S. Application Data

[63] Continuation of Ser. No. 929,098, Jul. 31, 1978, Pat. No. 4,196,477.

[51] Int. Cl.³ .................. A47K 11/02; C02F 1/02; C05F 11/08
[52] U.S. Cl. ........................... 4/449; 4/111.1; 4/111.6; 4/248; 4/347; 4/DIG. 12; 71/8; 210/178
[58] Field of Search ............ 4/449, 111.1, 111.2, 4/111.5, 111.6, 238, 347, DIG. 12, 300, 317–323, 348, 420, 434, 441, 442, 352, 460, 471, 472, 474, 475, 349–351; 210/179, 178, 220; 71/8–10; 422/225

[56] References Cited

U.S. PATENT DOCUMENTS

| | | | |
|---|---|---|---|
| 3,577,568 | 5/1971 | Johansen | 4/317 |
| 3,756,784 | 9/1973 | Pittwood | 71/8 X |
| 3,859,672 | 1/1975 | Modig | 4/DIG. 12 |
| 3,959,829 | 6/1976 | Nordgren | 4/449 |
| 4,096,592 | 6/1978 | Clark | 4/449 |
| 4,163,294 | 8/1979 | Patterson | 4/111.1 X |
| 4,196,477 | 4/1980 | Stewart | 4/111.1 |

FOREIGN PATENT DOCUMENTS

| | | | |
|---|---|---|---|
| 967303 | 5/1975 | Canada | 4/DIG. 12 |
| 975105 | 9/1975 | Canada | 71/8 |
| 992256 | 7/1976 | Canada | 4/111.1 |
| 2253737 | 11/1972 | Fed. Rep. of Germany | 4/DIG. 12 |
| 2241603 | 3/1973 | Fed. Rep. of Germany | 4/DIG. 12 |

Primary Examiner—Stuart S. Levy
Attorney, Agent, or Firm—Rogers, Bereskin & Parr

[57] ABSTRACT

The disclosure relates to toilets of the kind which incorporate a waste-receiving tank or chamber in which decomposition of waste material takes place. In a preferred embodiment of the invention, the toilet includes an air-manifold assembly upon which waste material collects and which receives heated air for removing moisture from the waste material by evaporation, and perforate baffle means which define air spaces laterally of the mass of waste material, into which heated air can pass for improving efficiency of moisture evaporation. A fan unit is provided for circulating heated air through the air manifold assembly and is readily removable from externally of the toilet housing for facilitating servicing of the toilet.

10 Claims, 10 Drawing Figures

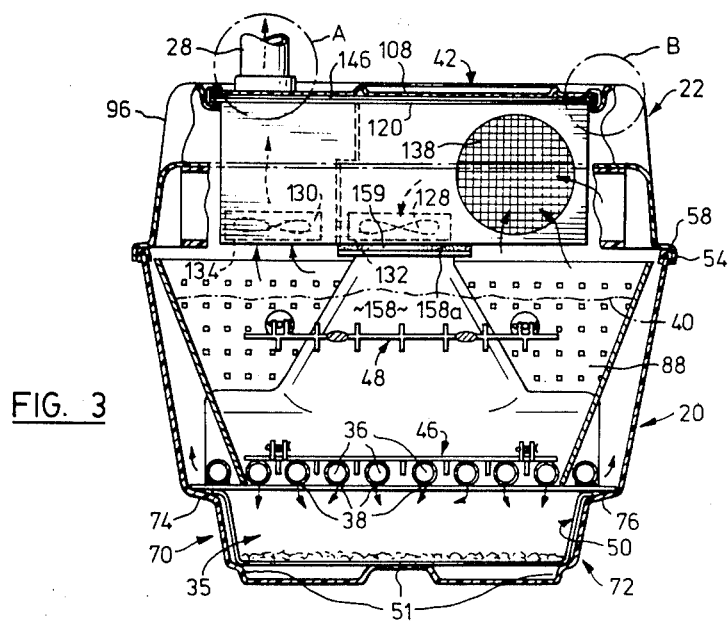
FIG. 3
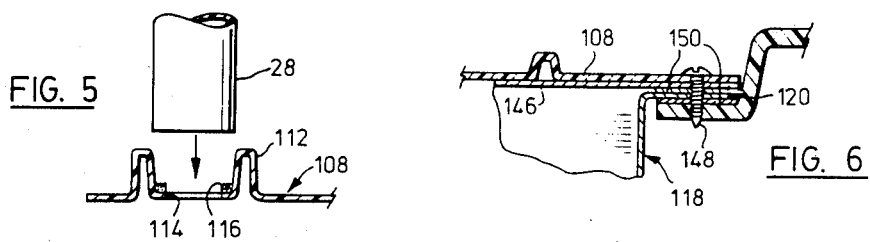
FIG. 5
FIG. 6
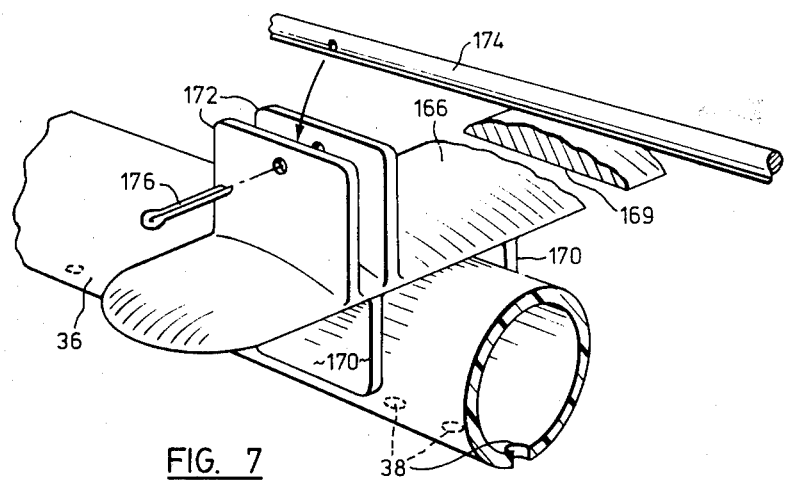
FIG. 7

TOILET

This is a continuation of application Ser. No. 929,098, filed July 31, 1978, now U.S. Pat. No. 4,196,477.

This invention relates to toilets of the kind which incorporate a waste-receiving tank or chamber in which decomposition of waste material takes place. Toilets of this kind are particularly useful, for example, in recreational homes which do not have access to municipal waste disposal systems, and in areas in which septic tank installations are not practicable.

Prior art toilets of this general kind are often referred to as composting or biological toilets and operate on the basis that the waste material in the toilet is broken down by bacterial decomposition. Such decomposition is accompanied by a reduction in the volume of the waste material, allowing the toilet to receive additional waste. Canadian Pat. No. 967,303 (Sundberg) is concerned with a toilet designed to provide conditions in the waste receiving chamber of the toilet which are favourable to bacterial action. This is achieved by an arrangement in which warm humid air is recirculated inside the waste receiving chamber. Examples of other prior art toilets of this type are disclosed in Canadian Pat. Nos. 975,105 (Andersson) and 992,256 (Sundberg).

Certain prior art composting or biological toilets have practical disadvantages. For example, in some toilets, biological decomposition takes place at a relatively slow rate, as a consequence of which extremely large waste receiving chambers are required. Another problem often encountered is that servicing of the toilets is difficult and requires the attention of experienced service personnel on site.

An object of the present invention is to provide improvements in toilets of the kind referred to above.

According to the invention, the toilet includes a housing defining a waste material receiving chamber and adapted to allow air to flow through the chamber from an inlet to an exhaust vent, and the housing includes a top which provides a seating surface and which has an opening for permitting entry of waste material to said chamber. Means are provided normally closing the opening when the toilet is not being used. A perforate waste material support is disposed in the waste material receiving chamber above a lower region of said chamber, and the support is adapted to allow waste material to accumulate thereon while allowing decomposed waste material to pass therethrough to said lower region of the chamber. A fan unit is mounted in said housing so as to be removable from externally thereof and comprises: a casing defining a fan compartment having an inlet communicating with said waste material receiving chamber, and an outlet; a fan disposed in the compartment and adapted to cause air to flow from said inlet to said outlet in use; and means for heating air passing through said compartment. The toilet further includes air conduit means associated with the fan unit for receiving heated air therefrom, the conduit means being arranged to deliver the air into the lower region of the waste material receiving chamber for contact with waste material on said support.

In order that the invention may be more clearly understood, reference will now be made to the accompanying drawings which illustrate a preferred embodiment of the invention, by way of example, and in which:

FIGS. 3 and 4 are vertical sectional views on lines III—III and IV—IV respectively of FIG. 2, showing the toilet assembled;

FIGS. 5 and 6 are detail sectional views of the areas of FIG. 3 denoted A and B respectively;

FIG. 7 is a perspective view of a detail of the toilet shown in FIG. 2;

Figures 1, 2:
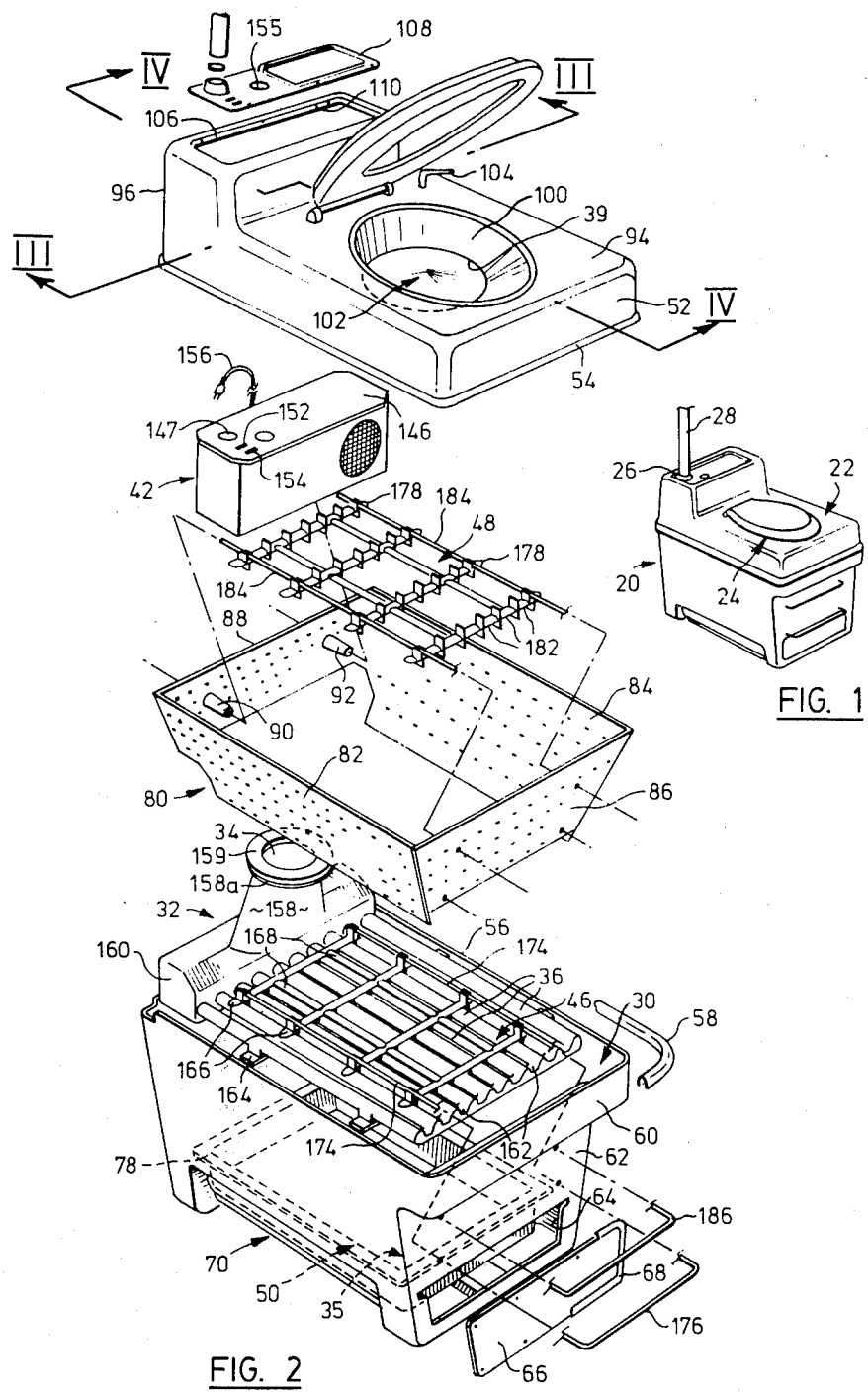
FIG. 1 is a perspective view from the front and to one side of a toilet according to the invention.
FIG. 2 is an exploded perspective view corresponding to FIG. 1 on an enlarged scale.

Referring first to FIG. 1, the toilet includes a housing made up of a lower part 20, in which decomposition of waste material takes place (as will be described), and a top 22 which is fitted to part 20. A conventional toilet seat assembly 24 is provided on top 22 and includes an annular seat and a lid. Top 22 also incorporates an exhaust vent, generally denoted 26, connected to a vent stack 28.

Figure 4:
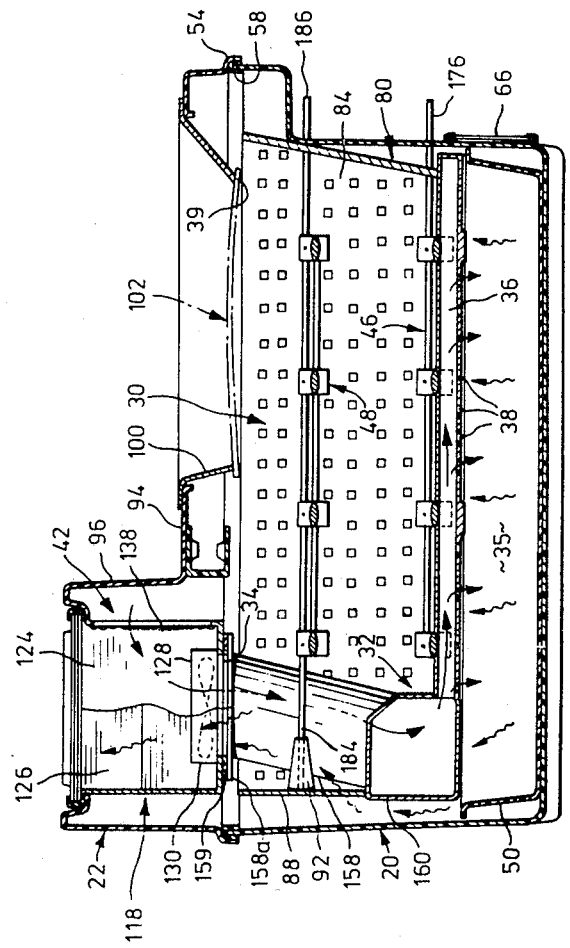

Before describing the structural features of the toilet in detail, it may be convenient to describe in general terms the principal components of the toilet and the manner in which it operates. Referring primarily to FIG. 4, numeral 30 denotes a waste material receiving chamber defined by the lower housing part 20. Disposed in the chamber is an air manifold assembly 32 which includes an air inlet 34 and a plurality of air outlet tubes 36 which are disposed above a lower region 35 of the waste material receiving chamber in spaced, generally parallel positions (see also FIG. 3). Each of these tubes has a series of longitudinally spaced perforations 38 in its lower side.

As seen best in FIG. 2, the tubes 36 together define a grid-like support which extends across the waste material receiving chamber 30 and on which waste material can accumulate. When the toilet is initially set up, a paper tissue sheet is placed over the tubes and is covered with a thin layer of soil to which bacterial nutrients have been added. As waste material enters chamber 30 through an opening 39 (FIG. 4) in the top 22 of the housing, the material builds up on top of the tubes 36 to form a mass inside chamber 30. The chain dotted lines denoted 40 in FIGS. 3 and 4 indicate the level to which the mass may typically rise in chamber 30.

A fan unit generally indicated at 42 is disposed above the inlet 34 of the manifold assembly 32 and draws air into chamber 30 through the opening 39 in the top 22 of the toilet housing. An electric heater coil 44 is incorporated in the fan unit for heating incoming air. The unit delivers the heated air downwardly into the air manifold assembly 32, from which it issues through the openings 38 in the air outlet tubes 36. The heated air leaving openings 38 percolates through the mass of waste material in chamber 30 and passes around the mass (as will be described) causing evaporation of moisture therefrom. Also, the mass is to some extent heated directly by contact with the manifold (which itself receives heat from the air passing therethrough). A raking device 46 and an agitator device 48 are provided in chamber 30 and can be manually operated as will be described.

It will be appreciated from the foregoing that the effect of the heated air passing through the mass is to cause the mass to tend to break down due to loss of moisture by evaporation. Bacterial decomposition also takes place due to the presence of naturally occurring bacteria in the waste material. As a result of these effects, the waste material decomposes into a fine powdery form and tends to pass through the spaces between the tubes 36 of the air manifold assembly and into the lower region 35 of chamber 30. This decomposition is accompanied by a substantial reduction in volume with the result that a very small amount of powder is actually produced. A tray indicated at 50 is provided in chamber region 35 for collecting this residual material. The bottom wall of housing part 20 is shaped to define a raised central rib and side ribs, generally denoted 51 on which the tray rests. This allows air to circulate below the tray for evaporation of any liquid which might accidentally be split.

The air which has passed through the mass of waste material in chamber 30 re-enters the fan unit 32 as will be described and is delivered into the vent stack 28 of the toilet. Thus, it will be appreciated that the air passes through the toilet in a single pass in contrast to certain prior art toilets in which the air is recirculated in the waste receiving chamber of the toilets.

Reference will now be made initially to FIGS. 2, 3 and 4 in describing the toilet in more detail. As indicated previously, the toilet housing is made up of two-parts 20 and 22. These parts are moulded in an ABS plastic material.

Top 22 includes a skirt 52 having a lip 54 which fits over the corresponding upper edge 56 of the lower housing part 20 with the interposition of a rubber sealing gasket, part of which is visible at 58. In the assembled toilet, the upper and lower parts of the housing are permanently secured together by pop rivets (not shown).

The lower housing part 20 is generally box-shaped and tapers downwardly somewhat towards its lower end, as can best be seen in FIG. 3. The top portion of the front wall of part 20 is shaped to define an overhanging part 60, below which the front wall is set back as indicated at 62. A generally rectangular opening 64 extends across the front wall of housing part 20 at its lower end to provide access to the interior of the housing for removing tray 50 during periodic maintenance of the toilet. A closure plate 66 is provided for fitting over opening 64 and has a peripheral seal, part of which is shown at 68, for ensuring liquid-tight sealing of plate 66 to housing part 20. Plate 66 is held in place by a series of self-tapping screws (not shown) which pass through openings in the plate and are screwed into part 20.

Recessed portions 70 and 72 extend longitudinally of the lower portions of the side walls of housing part 20. The cross-sectional shape of these recessed portions can best be seen in FIG. 3, from which it will be noted that the portions define respective inwardly directed shoulders 74 and 76 for supporting tray 50. It will be seen from the drawings that the tray is of generally rectangular shape and has an outwardly directed flange 78 which extends around the periphery of its side walls. Opposed longitudinal portions of this flange rest on the shoulders 74 and 76 so that the tray is longitudinally slidable on the shoulders. It will be seen from FIG. 2 that the opening 64 in the front wall of housing part 20 is in fact shaped to conform generally with the shape of tray 50 so that the tray can be readily withdrawn through the opening for maintenance of the toilet.

Disposed inside the waste material receiving chamber 30 of the toilet is a perforated basket-like structure generally denoted 80 which serves to hold the mass of waste material in the chamber clear of the sides of the lower housing part 20 and allows air from manifold assembly 32 to contact the sides of the mass. Thus, structure 80 defines four air spaces surrounding the mass into which air can flow from the lower region 35 of chamber 30. Structure 80 is shown in FIG. 2 outside housing part 20, and it will be seen that the structure is made up of four perforate baffles or plates 82, 84, 86 and 88 of a trapezoidal shape which are secured together by adhesive to form structure 80. As can be seen from FIGS. 3 and 4, the structure rests with the lower edges of the baffles supported on the tubes of the air manifold. The front and rear baffles 86 and 88 are formed with integral, inwardly projecting sleeves which act as guides for part of the agitator device 48 as will be described. The sleeves associated with plate 88 are denoted 90 and 92 in FIG. 2. The sleeves associated with plate 86 are not visible although they are the same as sleeves 90 and 92. The baffles 82, 84, 86 and 88 are made of a plastic material. In this embodiment, the material is foamed polyethylene.

The top 22 of the toilet includes a front portion having a generally flat top surface 94 and a rear portion 96 which is of generally rectangular shape and which extends upwardly above surface 94. Seat assembly 24 is pivotally mounted on surface 94 in conventional fashion and can be closed to cover the opening 39 when the toilet is not being used. A downwardly conical bowl 100 is fitted inside opening 39 and a closure device 102 (to be described) is provided for closing the opening while allowing air to be drawn into chamber 30 by fan unit 42. An operating handle for the closure device is visible at 104.

The rear portion 96 of top 22 has a rectangular opening 106 in its upper surface which is normally closed by a plate 108 arranged to fit into a recess 110 around opening 106 and to be secured in place by self tapping screws (see later). While plate 108 will normally be permanently secured in recess 110, it will be removable after removing the self tapping screws to provide access to the fan unit 42 as will be described. In addition to providing access to the fan unit, plate 108 incorporates the exhaust vent 26. Referring to FIG. 5 it will be seen that the plate 108 is shaped to define an upwardly projecting annular formation 112 and an opening 114 at the centre of the formation. Formation 112 is dimensioned so that the lower end portion of the vent stack 28 can be force-fitted into the formation. A sealing gasket 116 extends around opening 114 and co-operates with the bottom edge of stack 28 to form a substantially air-tight seal. Thus, it will be appreciated that the stack 28 can be readily detached from and reassembled to the toilet in the event that plate 108 is to be removed for maintenance purposes.

Figure 8:
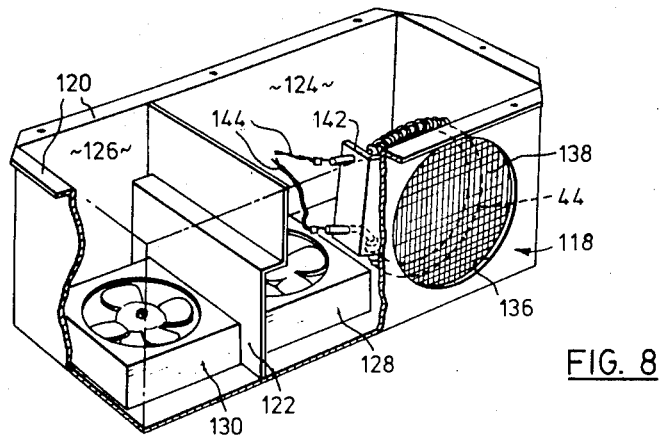
FIG. 8 is a perspective view, partly broken away, of one of the parts shown exploded in FIG. 2, and, FIGS. 9 and 10 are sectional views showing further details of the toilet.

As indicated previously, removal of plate 108 provides access to the fan unit 42 of the toilet. FIG. 8 shows the fan unit 42 separate from the remainder of the toilet. The unit includes a casing formed by a rectangular metal box 118 having an open top surrounded by outwardly turned flange 120. A partition 122 divides the interior of the box into two compartments, viz: an inlet compartment 124 and an exhaust compartment 126. Each of the compartments 124 and 126 is provided with an electric fan; the fan in compartment 124 is denoted 128 and the fan in compartment 126 is denoted 130. Each fan is mounted over an opening in the bottom wall of the housing 118. In FIG. 3, the opening associated with fan 128 is visible at 132 and the opening associated with fan 130 is visible at 134. Fan 128 is an inlet fan and serves to draw ambient air into the waste receiving compartment 30 of the toilet through the toilet bowl opening 39 in top 22 and to deliver the air into the air manifold assembly 32, while fan 130 is an exhaust fan and draws air upwardly out of chamber 30 and delivers it into the vent stack 28. Air enters the inlet compartment 124 of the fan unit through an opening 136 in the front wall of casing 118. Opening 136 communicates with the bowl opening 39 by way of compartment 30 as best seen in FIG. 4. A grill 138 extends across opening 136 to prevent entry of foreign matter. When the fan unit is in position in the toilet housing, inlet opening 136 is clear of the front wall of the rear housing portion 96 and is in free communication with chamber 30.

The electric heater coil 144 referred to previously is mounted inside compartment 124 at a slight spacing from opening 136. The heater coil is mounted on a bracket 142 attached to the inner surface of the front wall of casing 118. Thus, air drawn into compartment 124 by fan 128 is heated by coil 140. A thermostat (not shown) is provided for preventing over-heating of coil 140. Electrical power supply leads for coil 140 are visible at 144.

Casing 118 is dimensioned to fit closely inside opening 106 in the rear portion 96 of housing top 22 (see FIG. 2). The flanges 120 of casing 118 rest inside the recess 110 around opening 106 so that the fan unit is supported by way of the flanges. FIG. 3 shows the fan unit in this position. A metal closure plate 146 extends across and closes the open top of casing 118 except for a circular opening which communicates with vent stack 28 and is fitted with a wire mesh grill 147 (FIG. 2). Plate 146 is also visible in FIG. 6, which is a detail view showing part of the connection between casing 118 and the top 22 of the toilet housing. The plate 108 (described in connection with FIG. 2) fits on top of plate 146. Plate 108 is a plastic vacuum forming and acts as a facia or cover plate. Numeral 148 (FIG. 6) indicates one of the self-tapping screws used to hold the fan unit in position, and it will be seen that the screw passes through the facia plate 108, the closure plate 146 and the flanges 120 of the fan housing unit 118 and is screwed into the housing top 122. Strips 150 of foamed polyethelene tape are provided on both sides of flanges 120 for sealing purposes.

Referring back to FIG. 2, the electrical leads 144 for heater coil 140 and the leads for the fans 128 and 130 (not shown) are connected to a switch 152 mounted in plate 146. A pilot light 154 is associated with switch 152 for indicating when the heater is on. Switch 152 is a two position switch connected so that, in one position both the fans and heater coil of the toilet are "on", while in the other position only the fans are "on". Facia plate 108 carries a dial-form thermometer 155. It will be seen that thermometer 155 is located in the exhaust fan compartment 126 and will therefore indicate the temperature of the air leaving the toilet. A main power supply lead 156 is also connected to switch 152 for supplying power to the fans and to the heater coil. Lead 156 is plugged into any convenient power supply source when the toilet is in use. The toilet is designed with the intention that the fans 128 and 130 and the heater coil 144 will operate continuously to provide a continuous through-flow of heated air in compartment 30. The thermostat associated with heater coil 144 will be set to provide a substantially constant temperature in the region of 95° F. in order to promote bacterial action in the mass of waste material in the waste receiving chamber 30.

It will be appreciated from the foregoing that fan unit 42 incorporates all of the electrical equipment necessary for the toilet and that the unit as a whole is readily removable from the toilet for maintenance and service. This feature is a significant advantage in minimizing the maintenance costs of the toilet. Thus, the toilet may well be installed in a remote location not readily accessible to service personnel. However, fan unit can be readily removed by an unskilled person using a minimum of tools and can similarly be readily replaced. Accordingly, the owner of the toilet could himself remove and transport the fan unit for servicing without having to call on service personnel to visit and service the toilet.

The air manifold assembly 32 is in the form of a one-piece plastic moulding. In this embodiment, the assembly is made from polyethelene. The assembly includes an upright neck portion 158 which has at its upper end an opening defining the air inlet 34 of the assembly. The opening is surrounded by a flange 158a surmounted by an annular sealing gasket 159. As can be seen from FIGS. 3 and 4, gasket 159 seals against the bottom surface of the housing 118 of the fan unit 32 around the opening 132 therein so that air delivered from the inlet compartment 124 of the fan unit passes directly into the air manifold assembly. At its lower end, the neck 158 communicates with a header 160 from which the air outlet tubes 36 of assembly 32 project forwardly in spaced parallel positions. As discussed above, each of the tubes 36 has a series of longitudinally spaced openings 38 in its under surface. At their outer end, the tubes are connected by webs 162 by which the tubes are maintained in their parallel positions. Two supporting bars 164 extend transversely of the tubes 36 and are secured thereto by screws (not shown). The bars project outwardly to a slight extent beyond the endmost tubes and rest on the shoulders 74 and 76 formed in the side walls of the lower housing part 20 as can best be seen in FIG. 3.

As discussed previously, a raking device 46 and an agitator device 48 are provided in the lower housing part 20. Raking device 46 rests on the tubes 36 of the air manifold assembly 32 and is slidable longitudinally thereof. This device is designed to in effect "slice" dried-out waste material which may become caked on the tubes 36. As can best be seen in FIG. 2, device 46 includes four parallel scraper elements 166 which extend transversely of the tubes 36, and two longitudinal elements 168 connecting the elements 166. In this embodiment, the elements 166 and 168 are formed as a one piece plastic moulding of foamed polyethelene.

FIG. 7 shows an end portion of one of the scraper elements 166 and one of the tubes 36. Element 166 has a flat lower surface 169 which slides on the tubes 36 with a "slicing" action. Two lugs 170 depend from the lower surface of the element at the position of each of the tubes and are disposed one on each side of each tube so as to in effect guide the scraper element in its sliding motion. Also, at each end of each scraper element 166, two lugs 172 project upwardly in spaced parallel positions to form a mounting for an actuator rod 174. The rod is coupled to the lugs 172 by a cotter pin 176 which projects through aligned openings in the lugs 172 and in rod 174.

Referring back to FIG. 2, it will be seen that two actuator rods are in fact provided for moving the scraper elements. The rods extend through the front wall 62 of the lower housing part 20 and are connected by an external U-shaped portion 176 which can be manually moved back and forth to cause the scraper elements 166 to reciprocate on the tubes 36.

It is anticipated that, in practice, it will be necessary to operate the raking devices 46 only when the tray 50 of the toilet is to be emptied and that this will be required only very infrequently. Thus, it is believed that the waste material in the toilet will decompose to an extent such that only a minimum of residual material will be produced.

Agitator device 48 is somewhat similar to raking device 46 in that device 48 comprises four elements 178 which extend transversely of the waste receiving chamber 30, and two longitudinal elements 180 connecting elements 178. The elements 178 differ from elements 166 in that they are each provided with a series of lugs or fins 182 which project both above and below the element and which move through the mass of waste material when the device is in operation. Adjacent to each end of each element 178, the lugs are arranged to define mounting points for two actuator rods 184 in similar fashion to lugs 172 of scraper elements 166. Rods 184 project through the front wall of the lower housing part 20 and are connected by a U-shaped portion 186 by which the device may be manually reciprocated in the mass of waste material in chamber 30. As the device reciprocates the elements 178 and lugs 182 move back and forth and aerate the mass. This aeration assists movement of heated air through the mass and promotes evaporation of moisture. For these reasons it is desirable that device 68 be operated as often as convenient.

Figure 9:
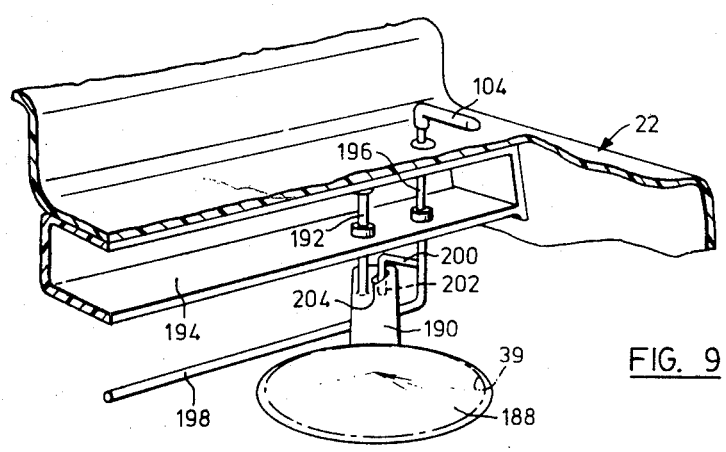
Figure 10:
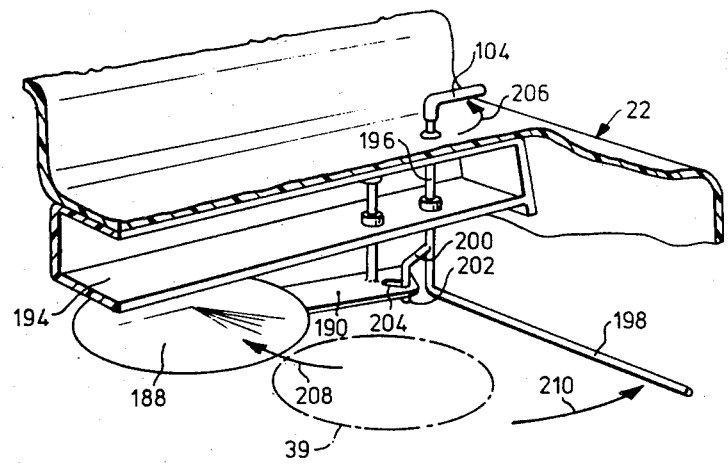

Reference will finally be made to FIGS. 9 and 10 in describing the closure device 102 for the toilet bowl. Thus, referring to those views, device 102 comprises a disc-form member 188 of a size and shape to fit below and close the opening 39 in the toilet bowl 100. The opening is represented in chain-dotted outline in both views. A link 190 projects generally radially from member 188 and is carried adjacent its outer end by a vertical pin 192 which is turnably mounted in a bracket 194 attached to the underside of the top 22 of the toilet. The actuating lever 104 of the toilet is coupled to a vertical rod 196 which extends parallel to rod 192, and which has, at its lower end, a laterally extending arm 198 disposed at a lower level than the bowl closure member 188. A crank member 200 extends laterally from member 196 just above the level of the link 190 (of member 188) and has a downwardly directed portion 202 which passes through a slot 204 in link 190. The slot is angled so that turning of shaft 196 by a means of handle 104 will cause member 188 to be turned about shaft 192 to a position clear of the toilet bowl opening 98. At the same time, the arm 198 will move in the opposite direction below member 188. Thus, referring to FIG. 10, movement of handle 104 in the direction of arrow 206 will cause member 188 to move in the direction of arrow 208 and arm 198 will move in the direction of arrow 210. The function of arm 198 is to distribute waste material laterally in the waste receiving chamber 30 in the event that the material builds up to a height approaching the toilet bowl outlet 98. Conversely, when the handle 104 is returned in the opposite direction, member 188 and arm 198 will return to their former positions as shown in FIG. 9.

It is believed that the toilet provided by the present invention will provide significant advantages compared with prior art toilets. For example, it is believed that the speed and completeness of decomposition of the waste material is improved. Thus, the design of the air-manifold assembly, basket-like baffle structure 80 and agitating device, will allow heated air passing through the toilet to permeate the mass of waste material to a substantial extent and remove moisture therefrom by evaporation. Also, the warm, moist atmosphere which will be prevalent in the waste receiving chamber of the toilet will promote bacterial action within the mass. Another significant advantage of the toilet is believed to be the removable fan unit which allows simplified servicing of the toilet as described above.

It will of course be appreciated that the preceeding description relates to a specific embodiment of the invention and that many modifications are possible within the broad scope of the invention. For example, apart from detail structural variations, certain features of the invention may be used independently of one another; the air manifold assembly 32, the basket-like structure 80 and the removable fan unit 42 of the invention may be used individually or in appropriate combinations in toilets other than of the form specifically described herein. Thus, in a toilet in which the air manifold assembly is used without the other two features, for example, the mass of waste material could extend right up to the side walls of the toilet housing and the fan and heater arrangement could be permanently mounted in the housing at an appropriate location. Similarly, the basket-like structure 80 could be used in a toilet having a permanently installed fan and heater arrangement and, instead of the air manifold assembly, a suitable form of air conduit means could be arranged to deliver air into the lower region of the waste material receiving chamber. A toilet having only the fan unit might include air conduit means for delivering air into the lower region of the waste material receiving chamber and any suitable form of perforate waste material support disposed in the waste material receiving chamber and adapted to allow material to accumulate thereon while allowing decomposed waste material to pass through into the lower region of the chamber. While these various alternative forms of toilet embodying features of the invention would not, it is believed, be as efficient as the toilet described with reference to the drawings, such toilets might be acceptable in certain circumstances.

Apart from the above modifications, it should also be noted that, in some cases, it may be possible to dispense with a tray in the lower region of the waste material receiving chamber for collecting decomposed material. Alternative means may be provided for removing the material, or in cases involving extremely low frequency use of the toilet, the fine powdery material could even be allowed to disperse in the air currents within the toilet. Another possible modification of the toilet would be to provide a separate inlet for the air passing through the toilet. In the described embodiment, the air enters through the waste material inlet for the waste receiving chamber of the toilet. An alternative would be to airtightly seal this opening and provide for a separate air inlet elsewhere in the housing of the toilet.

I claim:

1. A toilet comprising:
a housing defining a waste material receiving chamber and adapted to allow air to flow through the chamber from an inlet to an exhaust vent, the housing including a top which provides a seating surface and which has an opening for permitting entry of waste material to said chamber;

means normally closing said opening when the toilet is not being used;

a perforate waste material support disposed in said waste material receiving chamber above a lower region of said chamber, said support being adapted to allow waste material to pass therethrough into said lower region of the chamber;

a fan unit mounted in said housing so as to be readily removable from externally thereof, said unit comprising: a casing defining a fan compartment having an inlet communicating with said waste material receiving chamber and an outlet; a fan disposed in said compartment and adapted to cause air to flow from said inlet to said outlet; and means in said compartment for heating air passing from said inlet to said outlet; and, air conduit means having an inlet engaging and communicating with said fan unit outlet for receiving heated air therefrom, and a plurality of heated air outlets, said air conduit means being arranged to deliver heated air issuing from said heated air outlets in use into the lower region of the waste material receiving chamber for contact with waste material on said support;

and said air conduit means and fan unit being adapted to co-operate with one another to provide said communication between said inlet of the air conduit means and said fan unit outlet when the fan unit is mounted in said housing, and to permit said fan unit outlet to be readily separated from said inlet of the air conduit means when the fan unit is removed from the housing and wherein said conduit means comprises an air manifold assembly including a header and a neck portion which extends upwardly from said header and which is formed with said air inlet of the air manifold assembly, said inlet being disposed in communicating relationship with said outlet of the fan unit, whereby heated air is delivered directly from the outlet of said fan compartment into the air manifold assembly.

2. A toilet as claimed in claim 1, wherein said housing top is formed adjacent said seating surface with a generally rectangular opening which receives said fan unit and through which the unit is removable from the toilet housing, and wherein the casing is of an open-topped rectangular shape dimensioned to fit through said opening and includes flange means which project laterally from the casing adjacent said open top and beyond said opening, and which support the fan unit inside the toilet housing, and wherein the toilet further comprises a closure plate adapted to fit over and close said open top of the casing, and readily removable fastener means accessible from externally of the toilet housing and securing said flange means to said housing.

3. A toilet as claimed in claim 2, wherein said fan compartment is an inlet compartment, and wherein the fan unit casing further includes an exhaust fan compartment having an inlet communicating with said waste material receiving chamber, and an outlet communicating with said exhaust vent; and wherein the fan unit further comprises a second fan disposed in said exhaust compartment for delivering air to said exhaust vent.

4. A toilet as claimed in claim 1, further comprising control equipment for said fans and said heater means, said control equipment being carried by said fan unit and being operable from externally of the toilet.

5. A toilet as claimed in claim 4, wherein said closure plate is formed with an opening defining said exhaust compartment outlet, and wherein a cover plate is provided over said closure plate and is formed with a coupling adapted to be connected to an exhaust stack, said coupling communicating with said opening and defining said exhaust vent.

6. A toilet as claimed in claim 1, wherein said air manifold assembly is disposed in said waste material receiving chamber and including an air inlet and a plurality of air outlet tubes positioned above a lower region of said chamber, said tubes being disposed in spaced, generally parallel positions and forming a support upon which waste material can accumulate and through which decomposed waste material can pass into said lower region of the chamber, said tubes being formed with air outlet openings arranged so that air escaping from said openings in use passes into contact with said waste material.

7. A toilet as claimed in claim 1, wherein said air manifold assembly is disposed in said waste material receiving chamber and includes an air inlet communicating with said fan unit outlet and a plurality of air outlet tubes positioned above a lower region of said chamber, said tubes being disposed in spaced, generally parallel positions and forming said perforate waste support material; and wherein the toilet further comprises: perforate baffle means disposed in said waste material receiving chamber above said air outlet tubes of the air manifold assembly and arranged to confine the waste material and define laterally of said material at least one air space communicating with said lower region of the chamber and with said exhaust vent; and, agitator means disposed in said waste material receiving chamber above said air outlet tubes and adapted to permit periodic agitation of waste material supported on said tubes; said air outlet tubes of the air manifold assembly each being formed with a plurality of air outlet openings which are directed downwardly away from said waste material and which define the only air outlets from said manifold assembly, whereby air escaping from said openings in use is directed into said lower region of the chamber away from said waste material for promoting evaporation of liquid from said lower region of the chamber and can flow into said air space defined by said perforate baffle means and upwardly towards said exhaust vent.

8. A toilet as claimed in claim 7, wherein said baffle means comprise four perforate baffle plates arranged in a generally rectangular configuration and defining air spaces surrounding said mass of waste material and communicating with said lower region of the waste material receiving chamber.

9. A toilet as claimed in claim 7, wherein said waste material agitating means comprises an agitator device including a plurality of agitator elements positioned to extend through the mass of waste material in said waste receiving chamber, mounting means supporting said agitator elements at a spacing above the air outlet tubes of the air manifold assembly for horizontal reciprocatory movement through the waste material in said waste material receiving chamber, and means operable manually from externally of the toilet and coupled to said agitator elements for effecting said reciprocatory movement thereof.

10. A toilet as claimed in claim 7, further comprising a raking device which includes a plurality of scraper elements mounted generally transversely on the air outlet tubes of the air manifold assembly and adapted to reciprocatory sliding movement generally longitudinally of said tubes to slice dried out waste material from the tubes, and means operable manually from externally of the toilet for effecting reciprocatory sliding movement of said scraper elements.

* * * * *